J. C. DONNELLY.
BOX FILLING MACHINE.
APPLICATION FILED MAY 7, 1918.

1,326,187.

Patented Dec. 30, 1919.
7 SHEETS—SHEET 1.

Fig. 1.

Inventor:
Joseph C. Donnelly
by his Attorney
John T. Nolan

J. C. DONNELLY.
BOX FILLING MACHINE.
APPLICATION FILED MAY 7, 1918.

1,326,187.

Patented Dec. 30, 1919.
7 SHEETS—SHEET 5.

J. C. DONNELLY.
BOX FILLING MACHINE.
APPLICATION FILED MAY 7, 1918.

1,326,187.

Patented Dec. 30, 1919.
7 SHEETS—SHEET 6.

Inventor
Joseph C. Donnelly
by his Attorney

UNITED STATES PATENT OFFICE.

JOSEPH C. DONNELLY, OF BARBERTON, OHIO, ASSIGNOR TO THE DIAMOND MATCH COMPANY, OF CHICAGO, ILLINOIS, A CORPORATION OF ILLINOIS.

BOX-FILLING MACHINE.

1,326,187. Specification of Letters Patent. Patented Dec. 30, 1919.

Application filed May 7, 1918. Serial No. 233,081.

*To all whom it may concern:*

Be it known that I, JOSEPH C. DONNELLY, a citizen of the United States, and resident of Barberton, in the county of Summit and State of Ohio, have invented certain new and useful Improvements in Box-Filling Machines, of which the following is a specification.

This invention relates to machines for filling boxes with matches or the like, having reference more especially to machines for filling the tray-and-shuck form of box commonly employed for holding matches.

My invention is herein illustrated as embodied in the box filling machine set out in Patent No. 836,730 dated November 27, 1906, wherein are employed two continuously-movable endless series of receptacles arranged in juxtaposition, one series constituting temporary holders to receive and assemble matches as rapidly as they are discharged from a match making machine, and the other series constituting holders for boxes into the trays of which the matches are transferred from the temporary holders. Closed boxes, *i. e.*, assembled shucks and trays, are delivered to the box holders successively and carried thence into operative relation with the temporary holders for the matches, the box trays being severally progressively pushed outward almost, but not entirely, from their shucks in order to permit the efficient transference of the matches from the temporary holders to the trays. The trays, thus pushed outward from the shucks, are downwardly inclined toward their outer ends so as to insure the opening of the boxes to the fullest extent without disengaging the trays from the shucks. When the open inclined trays are supplied with matches from the temporary holders the trays are gradually returned to a horizontal plane and then pushed fully into their associated shucks or covers.

The purpose of thus assembling each tray and shuck and then partially opening the tray preparatory to the delivery of the matches thereto, is to insure the subsequent entry of the filled tray into the shuck, as, owing to the slightly warped or inturned end edges of the top and bottom walls of the shuck, particularly when it is constructed of wood veneer, great difficulty is experienced in entering the tray into the shuck if the tray and shuck be entirely separated, unless spring throat devices or similar guiding instrumentalities be interposed between the tray and the shuck.

The primary object of the present invention is to provide a box filling machine wherein the complementary trays and shucks are fed from separate sources of supply and are partially entered endwise one within the other during their progression, preparatory to the delivery of the matches to the trays; thereby obviating the otherwise necessity of "nesting" the trays and shucks before feeding them to the machine. Other objects of the invention will hereinafter appear.

According to my invention the progressing tray and shuck elements, supported in endwise relation to each other, are so relatively tilted and moved that the inner end of each tray is partially engaged with its shuck without liability of endwise abutment of the members. Such tray thus engaged with its shuck is presented in an inclined position to the filling station and supplied with matches, and thereafter the filled tray and its shuck are brought into substantial parallel alinement with each other in order to facilitate the telescoping of the associated box elements.

In the form of embodiment of my invention herein illustrated the complementary trays and shucks are delivered in a horizontal position, and in endwise relation to each other, upon traveling box holders, and coördinated mechanisms are arranged in the paths of the trays and shucks so as to effect the relative tilting and endwise engaging motion of the progressing box elements and thereafter dispose such elements in parallelism, or substantially so, all of which, together with various other novel coöperating devices, will be hereinafter described in detail. The precise scope of the invention will be defined in the appended claims.

In the annexed drawings—

Referring to the drawings, 25 designates a portion of the main frame of a match making machine; 26 a portion of the match carrier, and 27 a reciprocating head carrying a row of punches 28 for ejecting the matches row by row from the carrier.

An endless chain of temporary match holders 29 is arranged to travel adjacent the match carrier and to receive and assemble the matches discharged therefrom; each holder, as to its interior dimensions, being equal to or slightly greater in length than a match and of a width and height to receive and hold a sufficient quantity of matches for a box. The chain of temporary holders is guided about a pair of suitably-spaced sprocket wheels 30, 31 at the respective ends of the machine, the shafts of which are supported in a horizontal bed 32 arranged below the line of discharge of the matches from the carrier. The shaft 33 carrying the wheel 30 is appropriately geared with and driven from the shaft (not shown) of the match machine; but the shaft 34 is stationary and the wheel 31 is mounted to turn freely thereon.

In the present instance the lower end of the shaft 33 carries a bevel-wheel 35 in mesh with a similar wheel 36 on a horizontal shaft 37 that is mounted in suitable bearings below the bed. On the shaft 37 is a spur wheel 38 to which motion is transmitted from the main shaft of the match machine. Through the gearing described the endless chain of temporary holders is continuously impelled at a prescribed speed across the path of the stream of matches ejected from the match carrier.

39 designates a box-carrier comprising an endless chain of links provided with box receptacles which correspond in number and relation with the temporary match-holders and are arranged to travel adjacent to and at the same speed as said holders. Each of the links includes a body having two flat horizontal surfaces 40, 41 with an intervening longitudinal groove or guide way 41ª. The surface 41 is slightly raised, as shown. The lower surface 40 is provided with a comparatively thin vertical wall 42 about equal in height to that of a box-shuck, and the upper surface 41 is provided with a predetermined limits, but as the starting current falls, the shunt coils will overcome the attractive force of the series coils and close the switches, and hold them in closed positions so long as the direction switch D remains closed. As the current falls the switch arm 44 first closes, as its series coil 27 has fewer turns of wire than the series coil 28, and in closing, the arm 44, which is connected to the supply circuit by conductor 26, engages a contact 46, connected by conductor 47 to a point intermediate the ends of the coil 28 on the starter element $g'$, and thus the series coil 27 on the element $g$, the section $R'$ of starting resistance, and a portion of the windings of the series coil 28 become short circuited. Thereafter, when the starting current is below a predetermined value, the attractive force of the coil 28 becomes weakened and the shunt coil 39 on the element $g'$ moves the armature 45 to its closed position, thus short-circuiting the series coil 28 and the resistance section $R^2$ by reason of the engagement of the arm 45, which is connected to the supply wire L by the wire 26, with a contact 48 which is connected to the conductor 29, as shown.

The switch arm 45 cannot close to cut out the second section of the starting resistance until the armature has attained its normal speed, with full field strength, and the current in the armature circuit is normal. The closing of said switch arm brings into operation a field-controlling switch H, which acts to insert a predetermined amount of resistance in series with the shunt field winding $F'$ of the motor, and to short circuit the series field winding F, thus weakening the field of the motor and causing the armature of the motor to turn at a predetermined speed above the normal. The control circuit which the switch arm 45 closes extends from the supply wire L through conductor 26 to said switch arm, thence to the stationary contact 49 and by conductor 50 to solenoid $h$ of switch H, thence by conductor 51 to the supply wire $L'$. The completion of this circuit causes the solenoid $h$ to lift its core and the bridge-piece 52, carried by said core, engages contacts 53 and 54, connected to the conductors 36 and 51 which lead to the terminals of the series field coil F. Thus, said series coil becomes shunted. The core of the solenoid $h$ carries, also, another bridge-piece 55, which normally engages contacts 56 and 57 and completes a shunt circuit 59 around the variable resistance $r'$ included in the shunt field circuit 60 of the motor. Hence, normally, this resistance is not included in the shunt field, but as soon as the solenoid $h$ is energized and the bridge piece 57 is lifted, the resistance $r'$ becomes included in the shunt field circuit and weakens the field.

The shunt field $F'$, of the motor, is permanently connected to the supply wires L, $L'$, through circuit 60, as shown, and in this circuit are arranged the two variable resistances, $r'$ and $r^2$, which are normally short circuited by the field regulating switches H and $H'$. The switch H operates, as just described, to include the resistance $r'$ in the shunt field, when the motor has attained normal speed in one direction, and the switch $H'$ operates to include the resistance $r^2$ when the motor has attained normal speed in the opposite direction, as hereinafter explained, but the two field resistances are never interposed in the shunt field at one time. The purpose of providing two field resistances is to provide for operating the armature at a higher speed in one direction than the other, as desirable, for instance, in operating planer beds on the cutting and return strokes.

From the foregoing description it will be clear that, the master-switch being closed, if the tappet-switch E is closed against the contact 16 by one movement of the planer bed, the direction-switch D will close the armature circuit through the starter G and also close a circuit through the shunt coils of the starter, and after said starter has operated to cut out its resistance sections, the field controlling switch H will operate to short circuit the series field winding F and also to insert more or less of the resistance $r'$ in the shunt field circuit of the motor, depending upon the position of the contact arm 61.

Near the end of the next movement of the planer bed the blade of the tappet switch E will be moved out of engagement with the contact 16 and immediately into engagement with the contact 17. The solenoid $d$ of the direction switch D will thus be deënergized and the solenoid $d'$ of the direction-switch $D'$ will be energized. When the solenoid $d$ is deënergized, it will be evident that the armature circuit will be broken at the contacts 19—21, 20—22 and that the shunt or holding coils 39 and 40 on the starter G will be deënergized, allowing the switch arms 44 and 45 of said starter to rock to normal positions, and the opening movement of the arm 45 will interrupt the circuit through the solenoid coil of the field-controlling switch H, which switch will move to open the bridge around the series field winding of the motor, and to form a bridge around the field resistance $r'$.

The direction switch $D'$, starter $G'$ and field-controlling switch $H'$ are duplicates of the mechanisms D, G, and H, and are brought into action when the tappet switch blade engages the contact 17, to direct the current through the armature in the opposite sense, and to control the starting and acceleration of the armature in the opposite direction. A centrally pivoted lever J may be arranged between the movable members of the direction switches D and D' to insure the opening of one switch before the other closes.

The instant the blade of the tappet switch engages the contact 17, a circuit is completed from the line L through the tappet switch to conductor $15^c$, solenoid $d'$ of direction switch D', conductor 15, contacts 10 and 9 and conductor 14 to the line L'. The core of the solenoid lifts and completes the armature circuit at the contacts $21^a$, $19^a$, and $20^a$, $22^a$, and then the bridge-piece $23^a$ bridges the contacts $24^a$ and $25^a$ and thereby closes a circuit through the shunt or holding coils $39^a$ and $40^a$ on the starter elements $g^2$, $g^3$ of the starter G'. The armature circuit thus completed extends from supply wire L through conductors 37 and $37^a$ to contacts $19^a$ and $21^a$, thence through conductor 33 to contact 11 and the arm $b'$ of the master-switch, thence through conductor 32 to the motor armature A, thence by conductor 31 to contacts $22^a$ and $20^a$, thence by conductor 62 to contact $48^a$ of starter G', thence, successively, through resistance section $R^3$, series coil $28^a$, resistance section $R^4$, series coil $27^a$ and conductors 63 and 36 to the series field winding F of the motor, thence to the line wire L'. The circuit through the shunt windings of the starter G', which is completed by the operation of the direction switch D' is as follows: From line wire L through conductors 37 and $38^a$ to the shunt coils $39^a$ and $40^a$, thence by conductor $41^a$ to contact $24^a$, bridge-piece $23^a$ and contact $25^a$ and thence by conductor 42 to the supply wire L'.

The starter G' will operate in the same way as the starter G, the switch arm $44^a$ first closing against contact $46^a$ and short-circuiting the coil $27^a$, resistance section $R^4$ and a portion of the winding $28^a$, through conductor $47^a$, and switch arm $45^a$ then closing against contact $48^a$, thus short-circuiting the remaining active windings of the coil $28^a$ and the resistance section $R^3$, and also engaging contact $49^a$, which completes a circuit through the solenoid $h'$ of the field-controlling switch H'. This latter circuit extends from line L through conductors 37 and 64 to solenoid $h'$, thence through conductor 65 to contact $49^a$, switch arm $45^a$ and conductors 66 and 36 to the series field winding F of the motor, and thence to the supply wire L'. The completion of this last mentioned circuit causes the field-controlling switch H' to move upward and the bridge-piece $52^a$ thereon engages contacts $53^a$ and $54^a$ connected, respectively, to the wires 36 and 51, and the series field winding F of the motor thereby becomes short circuited. The bridge-piece $55^a$ is also lifted away from the contacts $56^a$ and $57^a$, and the shunt circuit $59^a$, around the field resistance $r^2$ is thereby broken and the resistance $r^2$, or a predetermined portion of it, becomes included in series with the shunt field F' of the motor. The contact arm $61^a$ may be set at any desired point, and this will determine the amount of resistance automatically included in the shunt field circuit when the switch H operates.

It will be plain from the foregoing that, as the tappet switch moves alternately back and forth from one of its contacts to the other, the set of devices D, G and H will operate alternately with the set of devices D', G' and H', and that as the elements of each set of devices instantly drop to normal positions when the tappet switch breaks the circuit through the solenoid of the direction switch of that set, the closure of the tappet switch in one direction or the other will always find the corresponding direction switch, starter and field switch in initial or normal positions.

With this apparatus, contrary to the usual practice, the motor armature is not slowed down or stopped prior to reversing the current in its circuit. When the armature is running at full speed in one direction, the tappet switch is thrown, causing an immediate reversal of the current in the armature circuit, and at the moment of the reversal of the current the electromotive force generated by the armature, running under its own momentum and the momentum of its load, is added to the impressed electromotive force of the supply circuit, thus making the voltage at the terminals of the armature circuit much greater than the normal voltage of the supply circuit, at the time the current is reversed. This would cause a destructive quantity of current to flow through the armature circuit were it not for the fact that each starter is provided with a sufficient amount of resistance, additional to the normal starting resistance, to compensate for the increased voltage at the terminals of the armature circuit at the time of reversal of the armature current and to limit the quantity of current flowing at such time to a safe amount, preferably the maximum starting current. It will be evident that the extra resistance required will vary according to the speed of the motor at the time of reversal of the armature current. This maximum starting current, flowing through the series windings of the starter, will cause both switch arms of the starter G, or G', as the case may be, to be held open, thereby maintaining both sections of starting resistance in circuit for the moment. But, the armature quickly slows down under the action of the reverse current in its circuit, and as it slows down its electromotive force in the direction of the line e. m. f. decreases to zero, thus reducing the voltage at the terminals of the armature circuit to normal, after which the armature starts to Such plungers are not herein illustrated as they are fully set forth in Patent No. 836,730 aforesaid.

Figure 12:
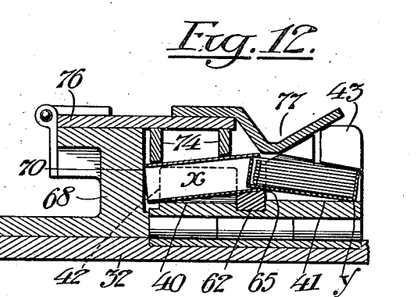
Figure 13:
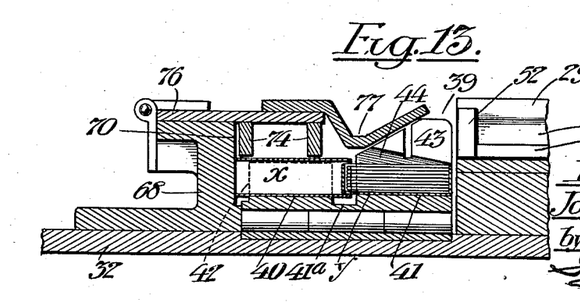
Figures 14, 15, 16:
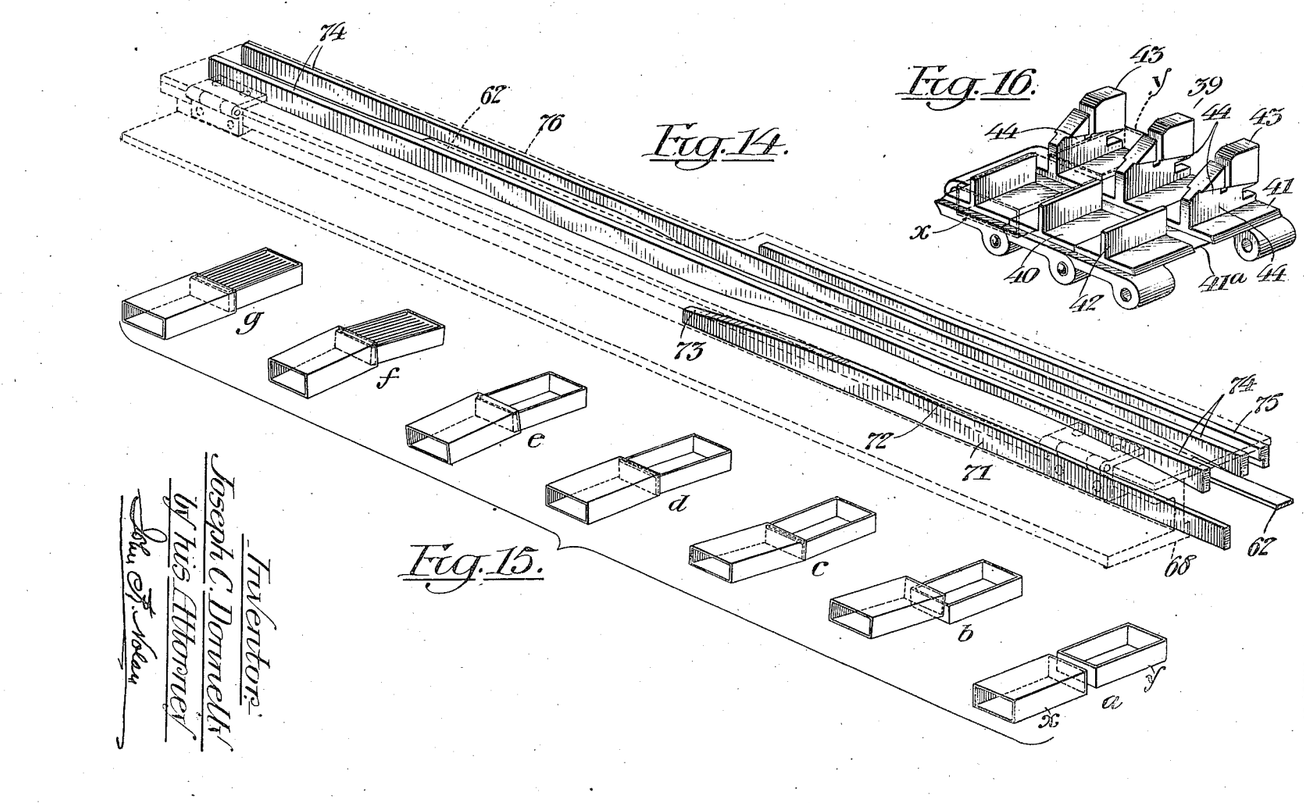
Fig. 14 is a skeleton perspective view of associated cam bars for relatively tilting and guiding the box members during their progress on the carrier; the outer cam wall and the hinged cap plate thereon being indicated in dotted lines.
Fig. 15 represents, in perspective, a series of box members in successive relative positions which they are caused to assume during their progress on the carrier.
Fig. 16 is a perspective view of several links of the box carrier; a box shuck and tray being indicated in dotted lines in one of the links.

A V-shaped member 77 overhangs the trays as they are progressing with the match transferring plungers, and thus serves as a guard to insure the downward passage of the matches to the traveling trays. In the present instance one end of this guard member is affixed to the hinged cap plate and is movable therewith to or from operative position as required. (See Fig. 12.)

The important feature of effectively engaging the adjacent ends of the complementary shuck and tray by relatively moving the box members in such a manner that the upper edge of the end wall of the tray is brought under the adjoining upper edge of the shuck and the bottom of the shuck then disposed partially beneath the bottom of the tray, is believed to be broadly new.

The mechanism herein illustrated for supplying trays and shucks in an orderly manner to the box carrier, comprises two magazines 82, 83 for trays and shucks respectively.

The tray magazine 82 includes in its construction a vertical chute having at its lower end a curved portion 84 which leads toward and terminates immediately in advance of the tray bearing portion of the box carrier as the latter approaches its upper horizontal path at the receiving end of the machine. The chute is supported by a suitable bracket 85 on the main frame. The trays are delivered side by side to the upper end of the chute, and fed down the same, such trays being gradually turned to a position with their bottoms downward as they pass along the curved lower portion of the chute and being thus advanced consecutively to and beyond the delivery end of the chute preparatory to their transference to the succeeding holders of the box carrier. Projecting horizontally from the floor of the chute at its delivery end are two spaced fingers 88 upon which the succeeding leading trays are temporarily supported as they leave the chute. Between the fingers, adjacent their outer ends, is a yielding up-standing stop against which the outer end of the leading tray contacts, which stop, in the present instance comprises an up-standing teat 87 formed on the free end of a spring which is affixed to a suitably-disposed lug on the bracket 85. (See Figs. 18, 19, 21, 22).

Figure 1:
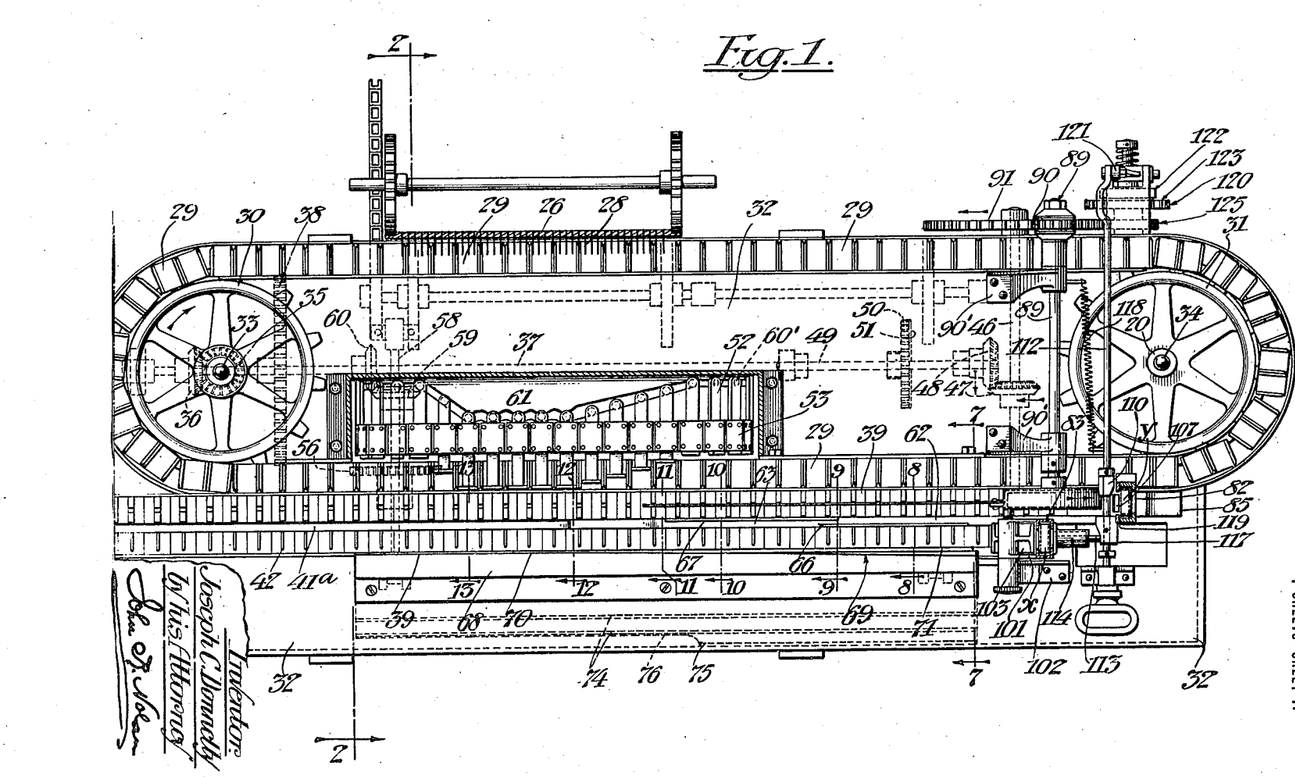
Figure 1 is a partial plan of a box-filling machine embodying my invention, a part of the associated match machine being indicated. In this view the hinged cap-plate which overhangs the box carrier during the operation of the machine is indicated in dotted lines as swung outward.
Figure 2:
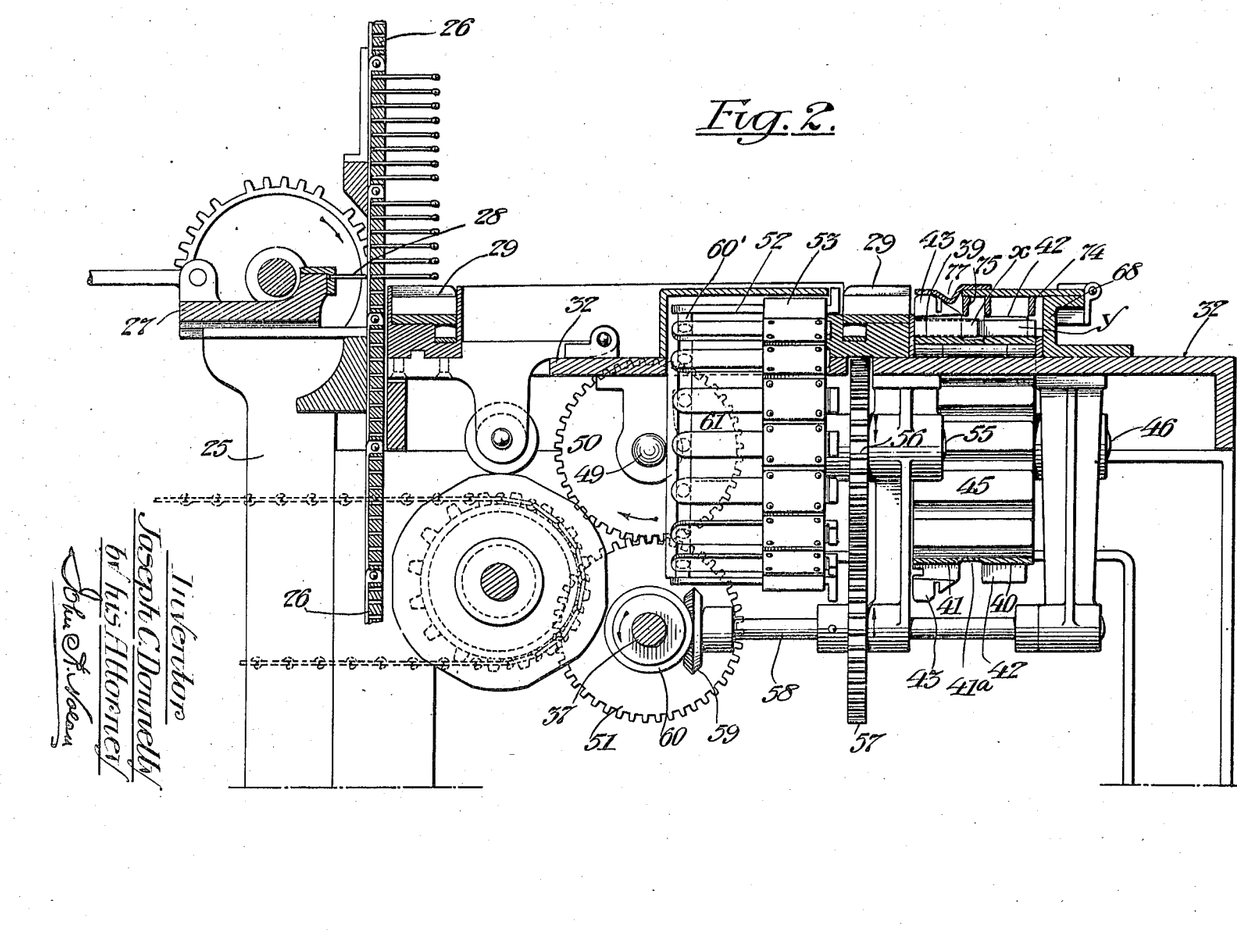
Fig. 2 is a partial transverse section, enlarged, of the filling machine on a plane through the match carrier and punch-out of the match machine, as on the line 2—2 of Fig. 1.

A feed wheel 88 overhangs the receiving end of the box carrier and acts upon the succeeding trays on the supporting fingers 86 so as to transfer such trays consecutively to the tray-supporting portions of said carrier. This wheel is fast on one end of a horizontal shaft 89 having its bearings in brackets 90' rising from the bed 32. (See Figs. 1 and 23.) On the opposite end of the shaft 89 is mounted a pinion 90 in mesh with a spur wheel 91 on the shaft 46 which carries the driving sprocket wheel 45 for the box carrier. The pinion is frictionally held on the shaft 89 by means, for example, of lateral friction washers 78 which embrace the wheel and are held in contact with the respective sides of the latter by means of collars 79, the outer one of which is adjustable by means of a nut 80 on the screw-threaded end of the shaft.

The ratio of the gears 90, 91 is such that the feed wheel is driven at much higher speed than the box carrier, except when the movement of the feed wheel is temporarily retarded, as hereinafter described, in which case the frictional connection permits relative variable movement between the pinion and feed wheel.

The wheel is provided with a series of peripheral projections 92 which are regularly spaced apart and are so disposed in relation to the trays as to impinge successively against the inner walls of the consecutive trays on the supporting fingers 86 at the delivery end of the chute with sufficient force to depress the spring 87. The wheel is provided, adjacent the respective projections, with inserts 94, preferably of hard metal, which are arranged to contact successively with the opposing walls 43 of the box holder. As each insert contacts with a wall 43 the movement of the rapidly rotating wheel is temporarily retarded to accord with that of the box carrier, but when the box holder advances sufficiently to permit the escape of the insert the wheel is rapidly advanced until the next succeeding insert contacts with the following wall of the holder. During the quick movement of the wheel the tray is rapidly moved to position for delivery to the box carrier. The acting portion of each of the projections is rounded and made smooth, as at 93, so that when a tray is pushed above the carrier by such portion, the tray may freely fall between the walls 43 of the underlying box holder. The inserts 94 obviate any liability of the portions 93 contacting with the walls 43 and thus becoming rough or abraded.

In order to prevent the endwise displacement of each succeeding tray at the delivery end of the chute, preparatory to its engagement by a wheel projection 93, I provide a light latch lever which is pivoted to a bracket 95 on a forward lateral extension of the lower end of the chute. The longer arm 96 of the lever is provided with a depending lip 97 which normally lies within the leading box in close relation to the inner wall of the latter. The other arm 98 of the lever extends into the path of a series of tappet studs 99 on one side of the wheel, which studs correspond in number and spaced relation with the projections 92, whereby during the rotation of the wheel the studs successively impinge against the arm and thus actuate the lever to effect and permit the alternate raising and lowering of the lip from and into the underlying tray respectively. When the lip is engaged with the inner wall of the leading tray, such lip coacts with the yielding stop 87 to hold the tray in place. When the lip is raised a wheel projection enters the tray and advances it as previously explained.

Figure 3:
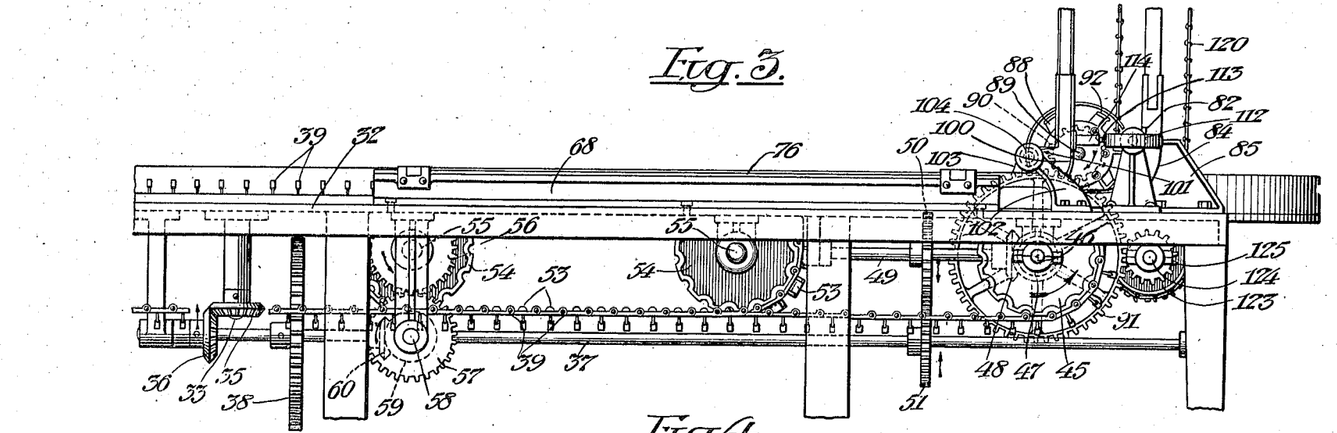
Fig. 3 is a front elevation of Fig. 1.
Figures 4, 5:
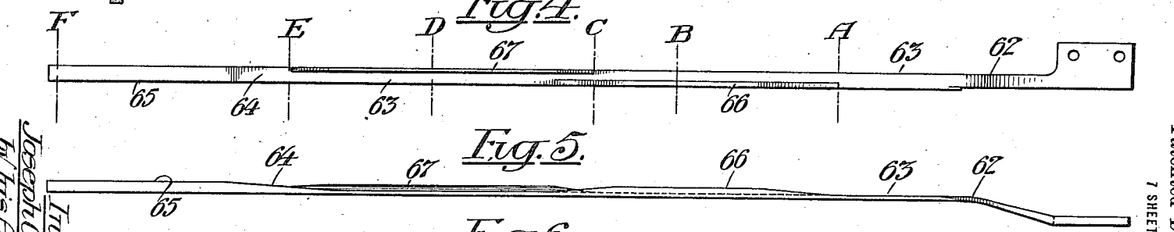
Fig. 4 is a detail, in plan, of a cam bar for acting upon the adjacent ends of the trays and shucks in the box carrier of the machine and gradually effecting the relative tilting of the box members.
Fig. 5 is a side elevation of said cam bar.
Figure 6:
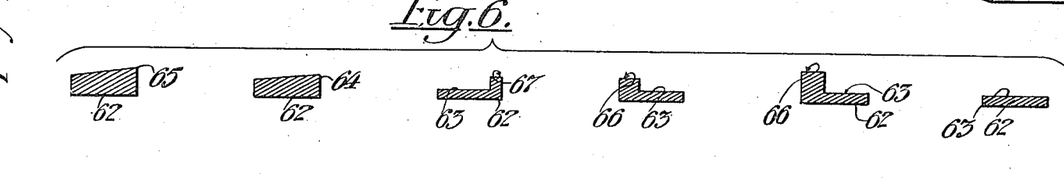
Fig. 6 illustrates cross sections of the cam bar at various points throughout its length, as on the lines A, B, C, D, E, and F, respectively, of Fig. 4, reading from right to left.
Figure 7:
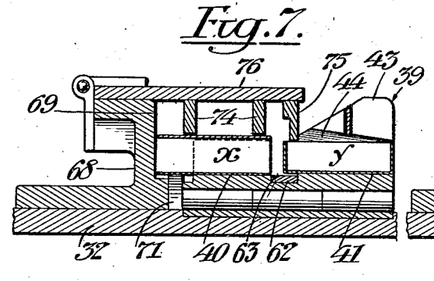
Figs. 7 to 13, inclusive, are transverse sections through the box-carrier and its associated parts, as on the respective lines 7—7 to 13—13, inclusive, of Fig. 1, showing succeeding relative positions of the box members in the carrier.
Figure 8:
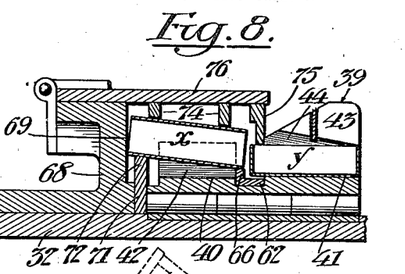
Figure 9:
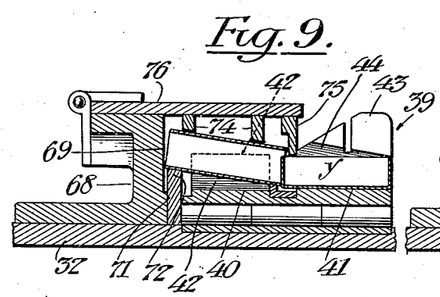
Figure 10:
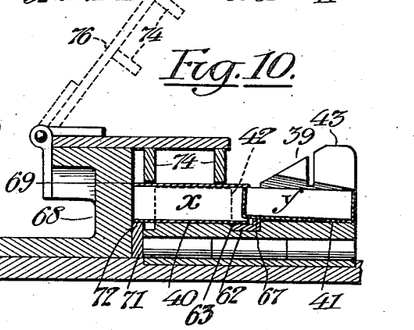
Figure 11:
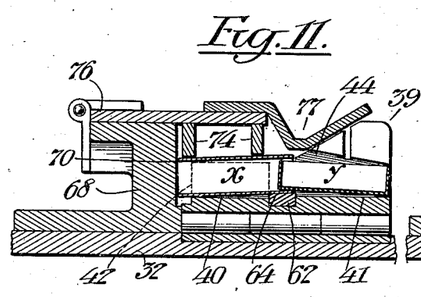

The shuck magazine 83 (Figs. 1, 3 and 17) includes in its construction a vertical chute having at its lower end a curved portion 100 which leads toward and terminates immediately above the shuck bearing portion of the box carrier as the latter approaches its upper horizontal path at the receiving end of the machine. The chute is supported at its lower end between a pair of spaced webs 101 formed on a bracket 102 which is affixed to the bed. The trays, end to end, are delivered to the upper end of the chute 83 and fed down the same, such shucks, similarly to the trays, being gradually turned to a position with their bottoms downward as they pass along the curved lower portion of the chute and being thus advanced consecutively to the delivery end of the chute where they fall, by gravity, into their respective holders on the box carrier.

Figures 17, 18, 19, 20:
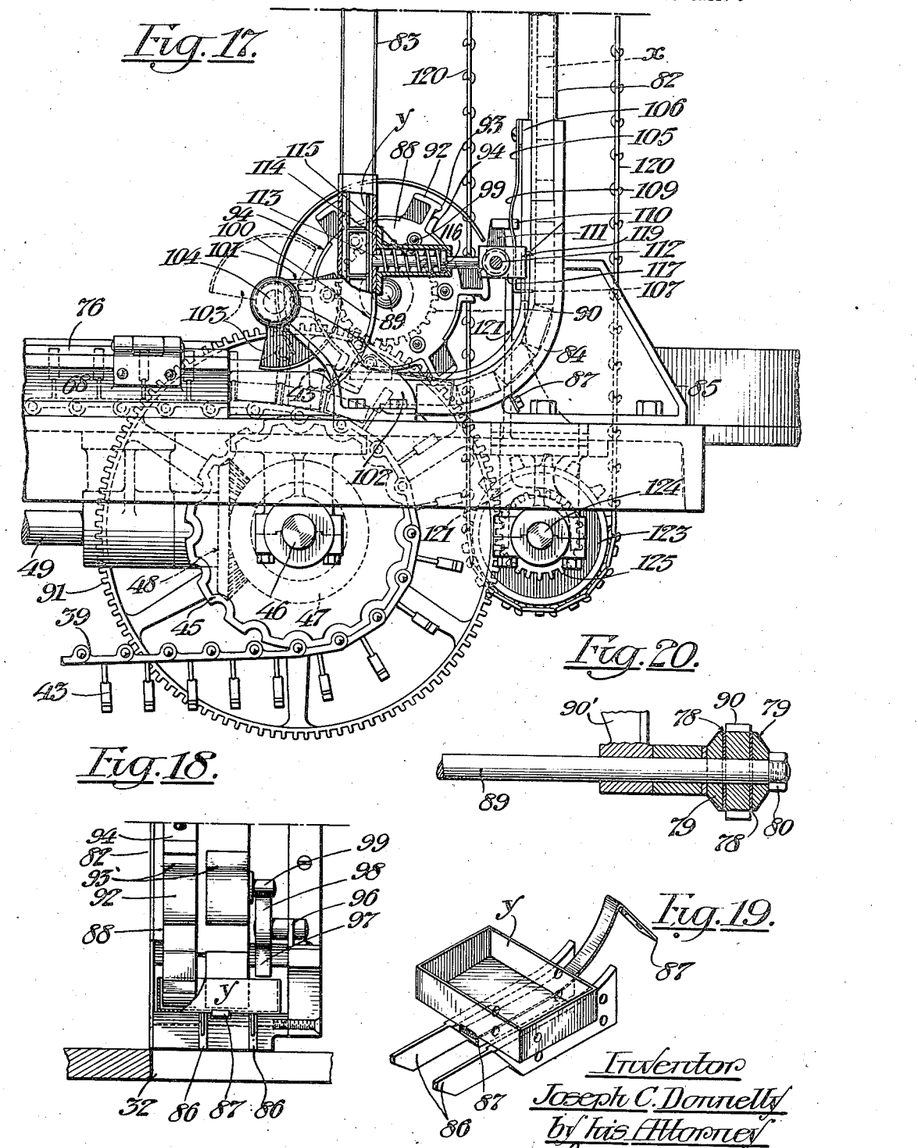
Fig. 17 is a side elevation, partly in section, of a portion of the machine at the receiving end of the box carrier; showing mechanism for delivering the trays and shucks to the carrier.
Fig. 18 is an elevation of the delivery end of the tray-feeding chute, and its adjuncts, including the wheel for transferring the trays successively from the chute to the box carrier. In this view a tray, partly in section, is shown as engaged by said wheel.
Fig. 19 is a perspective view of spaced tray-supporting fingers at the delivery end of the tray chute, together with a spring stop device for a tray; such tray being shown positioned on the fingers.
Fig. 20 is a sectional elevation of frictional drive gear, and adjuncts, for the tray transfer wheel.

The top of the lower curved portion of the chute 83 is preferably constituted by a sector 103 which is pivoted between the webs 101, as indicated at 104 Fig. 17, so that said sector can be readily swung upward in order to secure access to the lower part of the chute, or the shucks therein, as occasion may require.

Figures 21, 22, 23:
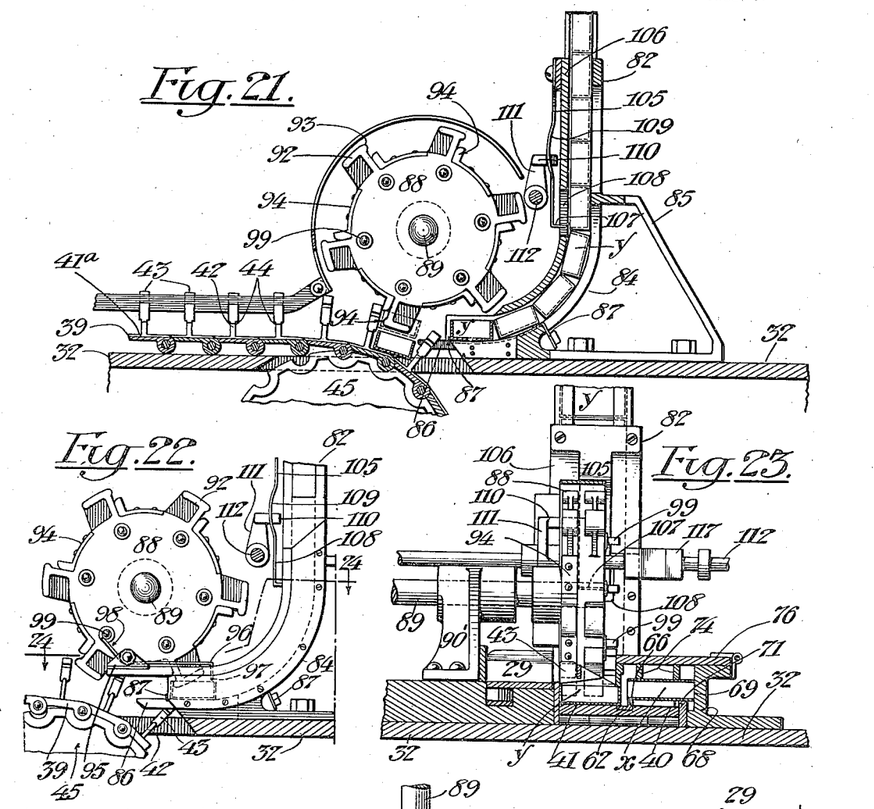
Fig. 21 is a longitudinal vertical section through the lower portion of the tray-feeding chute and adjuncts; the transfer wheel being in elevation, and the receiving end of the box carrier being in section.
Fig. 22 is a partial side elevation of the lower portion of the tray-feeding chute and adjuncts, including the transfer wheel, the tray-releasing device controlled thereby, and the receiving end of the box carrier.
Fig. 23 is a partial transverse vertical section through the box carrier and adjuncts, looking toward the tray and shuck feeding devices, the guard for the tray transfer wheel being broken away.
Figure 24:
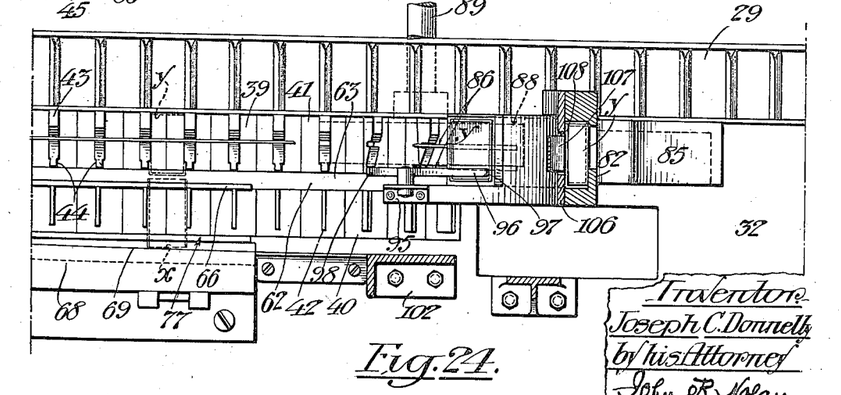
Fig. 24 is a transverse section through the tray chute and adjuncts, as on the line 24—24 of Fig. 22; showing the relative positions of the adjacent portions of the temporary match holders and the box carrier.

In order that the feeding of the shucks and trays to the box carrier can be simultaneously discontinued at will without the otherwise necessity of stopping the operation of the main machine, mechanism of the following character is provided, reference being had to Figs. 1, 3, 17, 21, 22 and 23 of the drawings:

105 designates a dog comprising a strip of spring metal affixed at its upper end to a vertical chute cover plate 106 supported on the bracket 85. The lower end of the strip has an inturned lip 107 which extends through an opening 108 in the adjacent wall of the chute and, by actuation of the strip, is movable into and from the vertical path of the trays in the chute. The inherent elasticity of the strip maintains the latter normally retracted from the trays, as seen in Fig. 21. The body of the strip is bent outward as at 109, into the active path of a cam 110, which is formed on the upper end of an arm 111 rising from a longitudinally slidable shifter rod 112 extending transversely of the machine. By actuating this rod the cam 110 can be moved against the strip so as to force the latter toward the chute and move the lip 107 into the path of the trays within the chute, and thus check their descent.

A horizontally-disposed plunger 113 (Figs. 1, 3 and 17) is movable into and from one side of the shuck chute, through an orifice in the latter, so as to contact with or release the shuck opposed thereto within the chute. This plunger is guided within a casing 114 fast on the perforated wall of the chute, and is normally held in retracted position by means of a confined spring 115 which, encircling the plunger, bears against a collar 116 on the latter and against the opposing wall of the chute. The outer end of the plunger extends into the active path of a cam block 117 fast on the rod 112. This cam is so shaped and positioned relatively to the cam 110, that when the rod is shifted, as above mentioned, the cam 117 bears against the end of the plunger at the same time the cam 110 contacts with the strip 105, thus checking the progress of the shucks simultaneously with the stopping of the tray feed. When the rod is retracted to its original position the cams are withdrawn from engagement with the dog and plunger, respectively, thus permitting the retraction of the dog and plunger and consequent release of the trays and shucks in their respective chutes.

In the present instance a spring 118 attached to the rod and to a fixed part of the machine holds the rod normally in a position with the cams 110, 117 retracted from the dog and plunger respectively; one corner of the cam 117 being notched, as at 119, so as to bear against the proximate corner of the chute 82 and thus limit the retracted position of the rod. (See Figs. 1 and 17.)

120 (Figs. 1, 3 and 17) designates a portion of an endless chain which leads to and effects the operation of certain mechanisms for supplying the trays and shucks in an orderly manner to the upper or receiving ends of their respective chutes; but as such mechanisms form no part of the present invention it is unnecessary to show or describe them herein. Suffice it to say that the operation of the chain is controlled simultaneously with that of the devices above described for checking and releasing the trays and shucks within the respective chutes; such chain control being effected by operatively connecting one end of the shifter rod 112 with an upstanding lever 121 which is constructed and arranged to determine by its actuation the active and idle positions of a clutch 122 for a chain driving wheel 123. This wheel and its clutch are mounted on a shaft 124 bearing a pinion 125 in mesh with the gear wheel 91 on the shaft 46 previously described.

I claim—

1. In mechanism for assembling the tray and shuck members of boxes, the combination with means for supporting separated complementary tray and shuck members in endwise relation to each other, of means for relatively tilting said members and for effecting relative endwise movement thereof toward each other, whereby the inner end of the top of the shuck member is caused to overhang the adjacent open end of the tray, and the inner end of the bottom of the shuck member is then caused to underlie the adjacent bottom edge of the tray.

2. The combination with means for impelling the separated tray and shuck members of a box in endwise relation to each other, of means for relatively tilting the progressing members and for effecting relative endwise movement thereof toward each other, whereby the inner end of the top of the shuck member is first caused to overhang the adjacent open end of the tray member, and the inner end of the bottom of the shuck member is then caused to underlie the adjacent bottom edge of the tray member.

3. The combination with means for impelling the separated tray and shuck members of a box in endwise relation to each other, of stationary cam elements arranged in the paths of the complementary tray and shuck members and constructed relatively to tilt the progressing members and also to effect endwise movement of said members toward each other, whereby the inner end of the top of the shuck member is first caused to overhang the adjacent open end of the tray member and the inner end of the bottom of the shuck member is then caused to underlie the adjacent bottom edge of the tray member.

4. The combination with means for impelling the separated tray and shuck members of a box in endwise relation to each other, of a cam element underlying the path of travel of the inner end of a tray member, a second cam element underlying the path of travel of the outer end of the shuck member, and a third cam element disposed forwardly of the shuck member and extending into the path of the outer end of the latter member, said several cam elements being so constructed and coördinated that the progressing members are relatively tilted and moved endwise toward each other, whereby the inner end of the top of the shuck member is first caused to overhang the adjacent open end of the tray member, and the inner end of the bottom of the shuck member is then caused to underlie the adjacent bottom edge of the tray member.

5. The combination with a traveling carrier constructed to support a row of tray members and a row of complementary shuck members therefor, the respective members being in endwise spaced relation to each other, of a stationary cam element arranged adjacent to and longitudinally of the paths of the inner ends of the tray and shuck members, and other stationary cam elements arranged in the path of the shuck members, said several cam elements being so constructed as relatively to tilt the progressing members and also to effect endwise movement thereof toward each other.

6. The combination with a traveling carrier constructed to support a row of tray members and a row of complementary shuck members therefor, the respective members in endwise spaced relation to each other, of a stationary cam element arranged adjacent to and longitudinally of the paths of the inner ends of the tray and shuck members, other stationary cam elements arranged in the path of the shuck members, said several cam elements being so constructed as relatively to tilt the progressing elements and also to effect endwise movement thereof toward each other, and means for supplying matches to the traveling tray members when their ends are thus engaged with the shuck members.

7. The combination with a traveling carrier constructed to support a row of tray members and a row of complementary shuck members therefor, the respective members in endwise spaced relation to each other, means for feeding tray members successively to the carrier, means for feeding shucks successively to the carrier, a stationary cam element arranged adjacent to and longitudinally of the paths of the inner ends of the complementary tray and shuck members on the carrier, and other stationary cam elements arranged in the path of the shuck members, said several cam elements being so constructed as relatively to tilt the progressing elements and also to effect endwise movement thereof toward each other.

Signed at Barberton in the county of Summit and State of Ohio this 3 day of May A. D. 1918.

JOSEPH C. DONNELLY.